United States Patent
Shimatsu

(10) Patent No.: US 11,269,463 B2
(45) Date of Patent: Mar. 8, 2022

(54) INPUT DEVICE

(71) Applicant: ALPINE ELECTRONICS, INC., Tokyo (JP)

(72) Inventor: Kenji Shimatsu, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 17/121,033

(22) Filed: Dec. 14, 2020

(65) Prior Publication Data

US 2021/0223884 A1 Jul. 22, 2021

(30) Foreign Application Priority Data

Jan. 17, 2020 (JP) .............................. JP2020-005857

(51) Int. Cl.
*G06F 3/044* (2006.01)
(52) U.S. Cl.
CPC .................................. *G06F 3/044* (2013.01)
(58) Field of Classification Search
CPC ...................................................... G06F 3/044
See application file for complete search history.

(56) References Cited

U.S. PATENT DOCUMENTS

| | | | |
|---|---|---|---|
| 9,292,142 B2 | 3/2016 | Yamaguchi et al. | |
| 2011/0007021 A1 | 1/2011 | Bernstein et al. | |
| 2015/0103043 A1* | 4/2015 | Hills | G06F 3/0443 345/174 |
| 2016/0306496 A1* | 10/2016 | Ishikawa | G06F 3/044 |

FOREIGN PATENT DOCUMENTS

JP   2014-178868   9/2014

OTHER PUBLICATIONS

Extended European Search Report for 21150903.9 dated Jun. 11, 2021 8 pgs.

* cited by examiner

*Primary Examiner* — Peter D McLoone
(74) *Attorney, Agent, or Firm* — Crowell & Moring LLP

(57) ABSTRACT

An input device includes a touch panel having a plurality of transparent electrodes disposed side by side, a hover signal generation unit for generating a hover signal used to detect a height of an indicator located above a surface of the touch panel to input the hover signal to the plurality of electrodes, an XY position detection unit for detecting an X position and a Y position of the indicator based on a signal component that appears on each of the electrodes, and a height detection unit for detecting a height of the indicator based on a signal component that appears on each of the electrodes. The height detection unit performs a correction to the height of the indicator when the XY position of the indicator is within a peripheral portion of the touch panel.

20 Claims, 4 Drawing Sheets

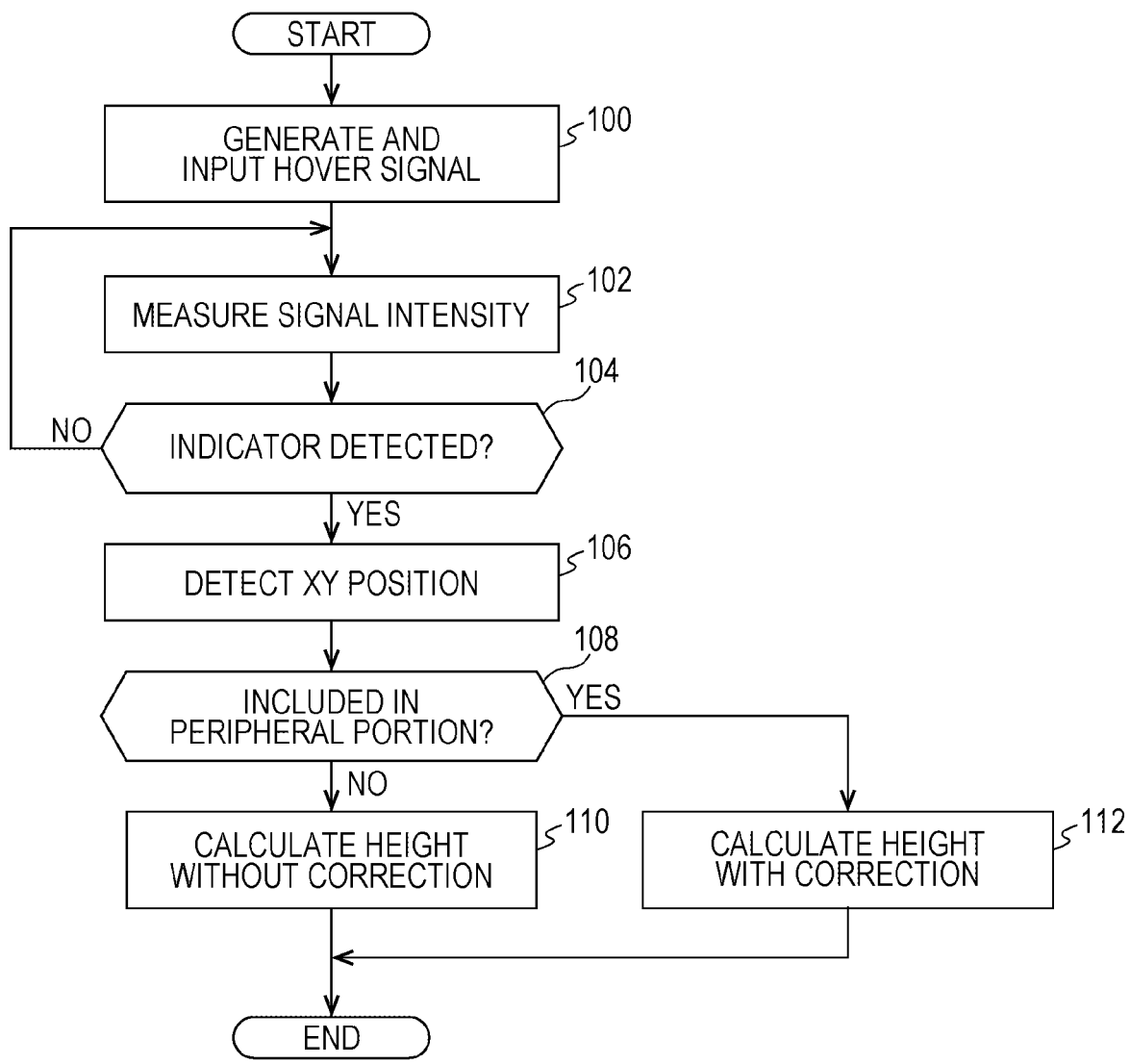

INPUT DEVICE

RELATED APPLICATION

The present application claims priority to Japanese Patent Application Number 2020-005857, filed Jan. 17, 2020, the entirety of which is hereby incorporated by reference.

BACKGROUND

1. Field of the Invention

The present invention relates to an input device configured to detect the position of an indicator such as a user's finger or the like using a touch panel.

2. Description of the Related Art

In the related art, an electronic device provided with a touch panel capable of a hover operation that enables an operation at a position away from the touch panel has been known (see, for example, JP 2014-178868 A). This electronic device performs a process of invalidating the detected coordinates of an indicator assuming that the indicator is located at the peripheral portion of the touch panel when the flatness of the area occupied by the indicator on a predetermined plane spaced away from the display face of the display unit by a predetermined distance is larger than a threshold value.

In the touch panel disclosed in JP 2014-178868 A described above, the coordinates when the indicator is located at the peripheral portion of the touch panel are disabled. Depending on how the display unit is used, however, it may be necessary to detect the position of the indicator at the peripheral portion of the display unit or the touch panel.

By using this touch panel, it is possible to detect not only the position along the X-axis direction and the Y-axis direction parallel to the display face, but also the vertical position of the indicator with respect to the display face. Since part of the indicator is placed outside the edge of the touch panel when detecting the height of the indicator at the peripheral portion of the touch panel, the number of electrodes facing the indicator at the peripheral portion is smaller than the number of electrodes at other places. Therefore, there is a problem that the detection level of the indicator is low, the height of the indicator determined based on this detection level is higher than the actual value, and the detection accuracy at the peripheral portion deteriorates.

SUMMARY

An object of the present disclosure is to provide an input device capable of preventing detection accuracy in the height direction at a peripheral portion of a touch panel from deteriorating.

To solve the above-mentioned problem, an input device of the present disclosure includes a touch panel having a plurality of electrodes disposed side by side, a detection signal generation unit configured to generate a detection signal used to detect a height to an indicator located at a position away from a surface of the touch panel to input the generated detection signal to each of the plurality of electrodes, a position detection unit configured to detect a position of the indicator along the surface of the touch panel based on a signal component that appears on each of the electrodes when the detection signal is input to each of the plurality of electrodes, and a height detection unit configured to detect a height of the indicator located at a position away from the surface of the touch panel based on a signal component that appears on each of the electrodes when the detection signal is input to each of the plurality of electrodes, wherein when detecting a height of the indicator, the height detection unit performs a correction to increase a height of the indicator when a position of the indicator detected by the position detection unit is included in a peripheral portion of the touch panel, compared with when a position of the indicator detected by the position detection unit is included in a non-peripheral portion.

Even when the indicator is located at the peripheral portion of the touch panel and the number of electrodes required for height detection is insufficient, the correction is performed to increase the height position by an amount, so that it is possible to prevent detection accuracy in the height direction due to the position of the indicator from deteriorating.

Further, it is desirable that the height detection unit described above detects a height of the indicator based on a signal component appearing on each of a predetermined number of the electrodes at the non-peripheral portion, and electrodes whose number is less than the predetermined number are included in the peripheral portion. As a result, it is possible to improve the detection accuracy in the height direction at the peripheral portion where the number (predetermined number) of electrodes required to detect the height of the indicator is insufficient.

Further, it is desirable that the height detection unit increases, at the above-mentioned peripheral portion, an amount of increase in height correction as a position of the indicator approaches a peripheral edge. This makes it possible to improve the detection accuracy in the height direction which deteriorates as the position of the indicator approaches the peripheral edge.

Also, it is desirable that the input device further includes a signal measurement unit configured to measure a signal intensity proportional to a capacitance generated between the indicator and each of the electrodes based on a signal component appearing on each of the electrodes, and the height detection unit detects a height of the indicator by summing a signal intensity corresponding to each of a predetermined number of the electrodes centered on a position of the indicator detected by the position detection unit. Specifically, when the height is detected by summing the signal intensity corresponding to each of a predetermined number of electrodes, the decrease, in the sum value, that occurs when the number of electrodes to be detected in the peripheral portion is less than the predetermined number can be compensated for by correction, so that it is possible to reliably prevent the detection accuracy in the height direction in the peripheral portion from deteriorating.

BRIEF DESCRIPTION OF THE DRAWINGS

FIG. 6 is a flow chart showing an operation procedure of an input device configured to detect the height of an indicator.

DETAILED DESCRIPTION OF THE PREFERRED EMBODIMENTS

An input device according to an embodiment of the present invention will now be described with reference to the drawings.

Figure 1:
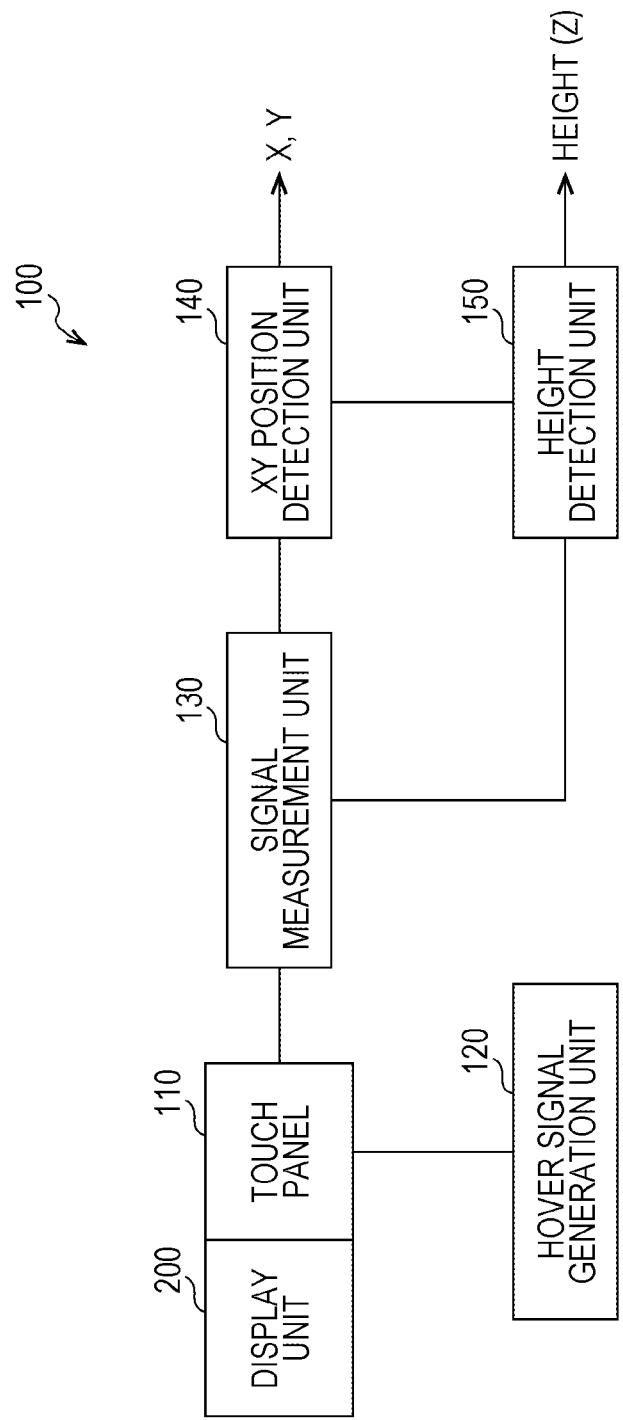
FIG. 1 is a diagram showing a configuration of an input device according to an embodiment.

FIG. 1 illustrates the configuration of an input device according to an embodiment. As shown in FIG. 1, an input device 100 of the present embodiment includes a touch panel 110, a hover signal generation unit 120, a signal measurement unit 130, an XY position detection unit 140, and a height detection unit 150.

The touch panel 110 is superimposed on the display face of a display unit 200 composed of a liquid crystal display (LCD) or the like, and includes a plurality of transparent electrodes 112 and 114 disposed side by side and used for detecting the position of the indicator. As the indicator, for example, the fingertip of the user is assumed.

Figure 2:
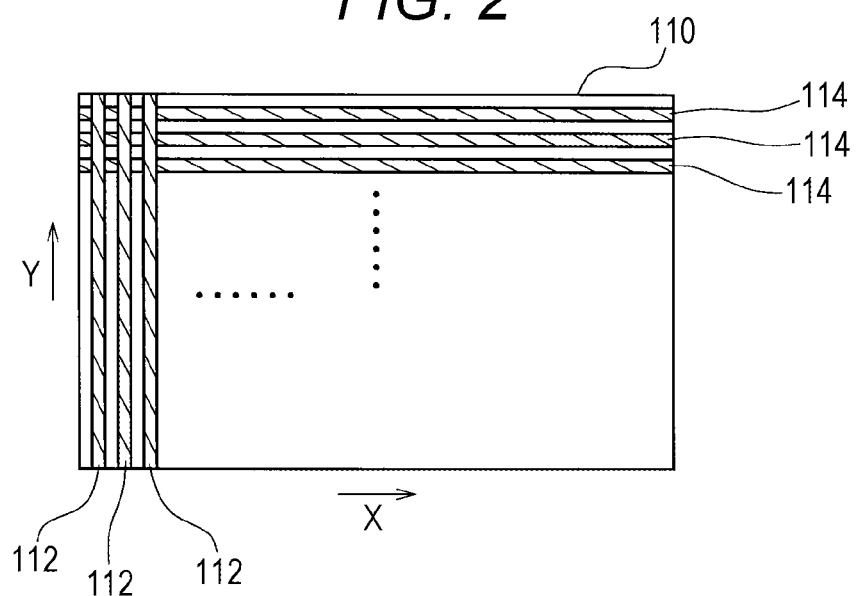
FIG. 2 is a diagram showing an outline of a transparent electrode included in a touch panel.

FIG. 2 is a diagram showing an outline of the transparent electrodes 112 and 114 included in the touch panel 110. As shown in FIG. 2, the touch panel 110 includes m transparent electrodes 112 disposed side by side at equal intervals along the X-axis direction (transverse direction) and n transparent electrodes 114 disposed side by side at equal intervals along the Y-axis direction (longitudinal direction), with the transparent electrodes 112 and the transparent electrodes 114 formed orthogonal to each other.

Figure 3:
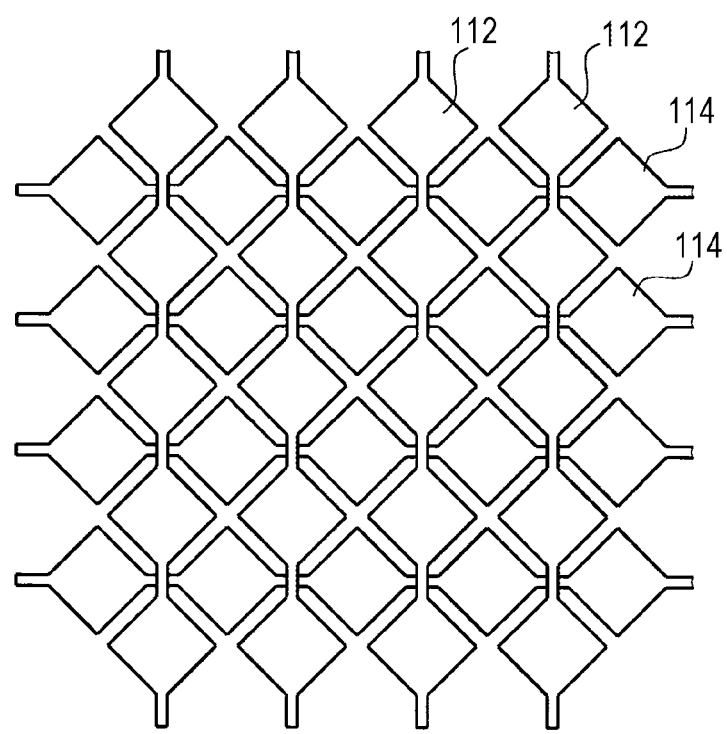
FIG. 3 is a diagram showing a specific example of a transparent electrode.

In FIG. 2, the two types of transparent electrodes 112 and 114 are shown as simple rod-shaped electrodes, but practically, the shape may be such that rectangles as shown in FIG. 3 are continuously connected, or other shapes may be applied.

Moreover, in the embodiment, the X coordinate position (X position) and the Y coordinate position (Y position) along the surface of the touch panel 110, and the Z coordinate position (height) away from the touch panel surface of the indicator brought close to the touch panel 110 to operate the hover operation are detected using the touch panel 110.

The hover signal generation unit 120 generates a hover signal as a detection signal used for detecting the X position, the Y position, and the height of the indicator to input the generated hover signal on one end of each of the transparent electrodes 112 and 114 included in the touch panel 110. As the hover signal, for example, a sine wave signal is used.

The signal measurement unit 130 receives a signal component appearing at the other end of each of the transparent electrodes 112 and 114, and measures the signal intensity proportional to the capacitance generated between the indicator and each of the transparent electrodes 112 and 114 based on this signal component. In the embodiment the self-capacity method is used. When the indicator approaches the touch panel, a capacitance of a magnitude proportional to the distance between the indicator and the transparent electrodes 112 and 114 is generated, and the level of the signal component output from the other end of each of the transparent electrodes 112 and 114 is decreased by this amount. The signal measurement unit 130 outputs a signal having an intensity corresponding to this decrease as a measurement result.

Figure 4:
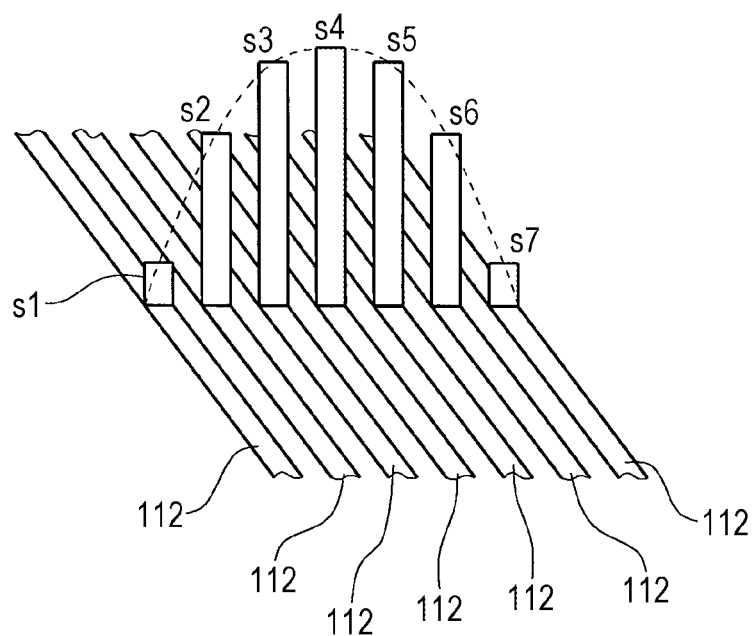
FIG. 4 is a diagram showing an output signal of a signal measurement unit.

FIG. 4 is a diagram showing an output signal of the signal measurement unit 130. In FIG. 4, the intensities s1 to s7 of the signals output from the other end of each of the transparent electrodes 112 on the one hand are shown. In the present embodiment, the signal intensities s1 to s7 of a total of seven transparent electrodes 112, that is, the transparent electrode 112 closest to the indicator and the three transparent electrodes 112 on both sides thereof are measured. Among them, the position of the transparent electrode 112 corresponding to the highest intensity s4 is a position of the transparent electrode 112 where the indicator is closest to the transparent electrode 112 and the capacitance between the indicator and the transparent electrode 112 is maximized, and is regarded as an X position of the indicator.

The same applies to the transparent electrodes 114. The signal intensities s1 to s7 of a total of seven transparent electrodes 114, that is, the transparent electrode 114 closest to the indicator and the three transparent electrodes 114 on both sides thereof, are measured. Among them, the position of the transparent electrode 114 corresponding to the highest intensity s4 is a position of the transparent electrode 114 where the indicator is closest to the transparent electrode 114 and the capacitance between the indicator and the transparent electrode 114 is maximized, and is regarded as an Y position of the indicator. The XY position detection unit 140 detects the position of the set of transparent electrodes 112 and 114 whose maximum intensity s4 is measured in this way as the X position and the Y position of the indicator.

The height detection unit 150 detects (calculates) a height H of the indicator based on the value S obtained by summing the signal intensities s1 to s7 of a total of seven transparent electrodes 112 (FIG. 4) centered on the X position of the indicator, and the signal intensities s1 to s7 of a total of seven transparent electrodes 114 centered on the Y position of the indicator. An example of the calculation formula for performing this detection is shown below.

$$H = -\ln(S/318.24) \times (1/0.062) \qquad (1)$$

where, the parameters included in this equation are values that are calculated or measured according to the amplitude and frequency of the hover signal used, the resistance values and shapes of the transparent electrodes 112 and 114, etc. and as an example, Equation (1) is shown.

The sum value S included in Equation (1) is the sum value of the intensity of the signal output from each of the seven transparent electrodes 112 and the seven transparent electrodes 114. Equation (1) cannot be applied in the place where signals cannot be obtained from these fourteen transparent electrodes 112 and 114.

Figure 5:
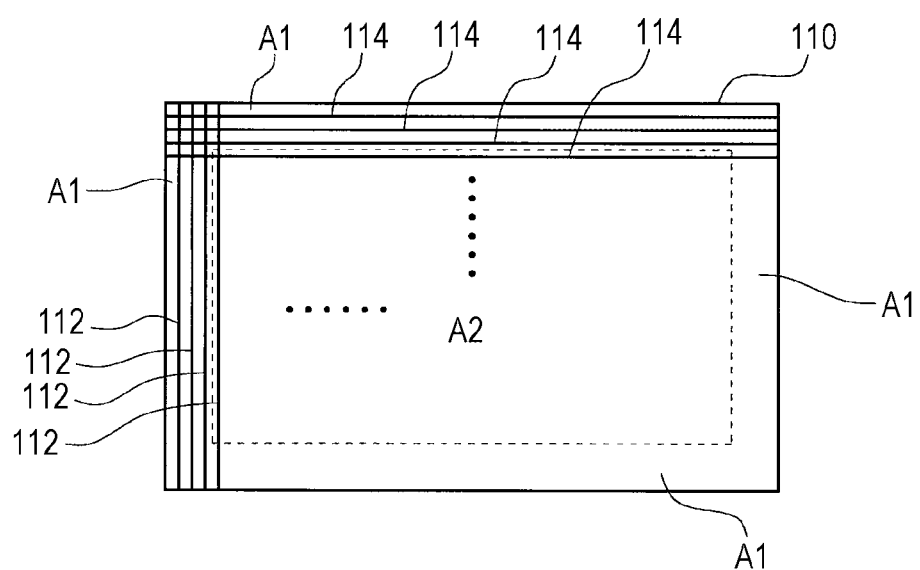
FIG. 5 is a diagram showing a non-peripheral portion to which Equation (1) is applied and a peripheral portion to which Equation (1) is not applied.

FIG. 5 is a diagram showing a non-peripheral portion to which Equation (1) is applied and a peripheral portion to which Equation (1) is not applied. In FIG. 5, a peripheral portion A1 of the touch panel 110 is the range in which the three transparent electrodes 112 or the three transparent electrodes 114 nearest the peripheral edge are included, and a non-peripheral portion A2 is the range inside the peripheral portion A1.

When the X position and the Y position of the indicator are included in the non-peripheral portion A2, the intensities of the signals output from the seven transparent electrodes 112 and the seven transparent electrodes 114 can be summed up, and Equation (1) can be used to calculate the height of the indicator.

On the other hand, when either the X position or the Y position of the indicator is included in the peripheral portion A1, some of the transparent electrodes 112 and 114 for which signal measurement is desired to be performed would be outside the edge of the touch panel 110, and because there is no transparent electrode corresponding to this portion, some of the desired signals cannot be measured. In this case, since the signal intensity corresponding to this missing transparent electrode cannot be added, the sum value S of the signal intensity is smaller by this amount, and when Equation (1) is used as it is, the height H of the indicator is larger than it actually is. This tendency increases as the X position and the Y position of the indicator approach the edge (outer peripheral portion) of the peripheral portion A1.

Therefore, in the present embodiment, when the X position and the Y position of the indicator are included in the peripheral portion A1, the height detection unit 150 performs correction (adjustment) according to the position. An example of the calculation formula when correcting Equation (1) is shown below.

$$H = -\ln(S/318.24) \times (1/0.062) \times a/\sqrt{(x^2+y^2)} \qquad (2)$$

$a/\sqrt{(x^2+y^2)}$ included in this equation is the correction coefficient when the indicator is included in the peripheral portion A1. a is a constant obtained from actual measurement. Further, x is the distance from the end of the non-peripheral portion A2 to the X coordinate of the indicator, and y is the distance from the end of the non-peripheral portion A2 to the Y coordinate of the indicator.

Since the closer the indicator is to the edge of the peripheral portion A1 the more the number of transparent electrodes 112 and 114 for which the signal intensities are summed up decreases and the smaller the sum value is, the height H will increase by the sum value decreased when Equation (1) is used. The error of height H can be corrected by performing adjustment by subtracting the height H by the correction coefficient $a/\sqrt{(x^2+y^2)}$ using Equation (2).

The hover signal generation unit 120 described above corresponds to the detection signal generation unit, the XY position detection unit 140 corresponds to the position detection unit, the height detection unit 150 corresponds to the height detection unit, and the signal measurement unit 130 corresponds to the signal measurement unit.

The input device 100 according to the present embodiment has the above configuration. Next, the operation thereof will be described.

FIG. 6 is a flow chart showing an operation procedure of the input device 100 configured to detect the height of the indicator. When the detection operation in the hover operation is started, the hover signal generation unit 120 generates a hover signal to input to one end of each of the transparent electrodes 112 and 114 (step 100).

Next, the signal measurement unit 130 measures the signal intensity proportional to the capacitance generated between the indicator and each of the transparent electrodes 112 and 114 based on the signal component appearing at the other end of each of the transparent electrodes 112 and 114 (step 102). Further, the signal measurement unit 130 determines whether an approaching indicator is detected based on the measured signal intensity (step 104). When the indicator is not close (when the signal intensity corresponding to the indicator is not detected), a negative determination is made, and the process returns to step 102 to continue the signal intensity measurement.

Further, when the indicator is close (when the signal intensity corresponding to the indicator is detected), a positive determination is made in the determination in step 104. Next, the XY position detection unit 140 detects the X position and the Y position of the indicator based on the intensity of the signal measured by the signal measurement unit 130 (step 106).

Next, the height detection unit 150 determines whether the indicator is included in the peripheral portion A1 (FIG. 5) based on the X position and the Y position of the indicator (step 108). When it is not included (if the indicator is included in the non-peripheral portion A2), a negative determination is made. In this case, the height detection unit 150 calculates the height H using Equation (1) without correction based on the sum value of the signal intensities corresponding to a total of fourteen transparent electrodes 112 and 114 centered on the X position and the Y position of the indicator (step 110).

On the other hand, when the indicator is included in the peripheral portion A1, a positive determination is made in the determination in step 108. In this case, the height detection unit 150 calculates the height H using Equation (2) with correction based on the sum value of the signal intensities corresponding to less than fourteen transparent electrodes 112 and 114 centered on the X position and the Y position of the indicator (step 112).

In this way, since the input device 100 of the embodiment performs the correction to increase the height position by this amount even when the indicator is located at peripheral portion A1 of the touch panel 110 and the number of transparent electrodes required for height detection is insufficient (less than fourteen in total), it is possible to prevent detection accuracy in the height direction due to the position of the indicator from deteriorating.

Further, in this correction, the amount of increase in the height correction is increased as it approaches the edge (outer peripheral portion) of the peripheral portion A1, and it will be possible to improve the detection accuracy in the height direction that deteriorates as the position of the indicator approaches the outer peripheral portion.

Specifically, when the height is detected by summing the signal intensity corresponding to each of a predetermined number (seven in each of the X-axis direction and the Y-axis direction) of transparent electrodes 112 and 114, the decrease in the sum value that occurs when the number of transparent electrodes to be detected in the peripheral portion A1 is less than the predetermined number can be compensated for by correction, so that it is possible to reliably prevent the detection accuracy in the height direction in the peripheral portion A1 from deteriorating.

The present invention is not limited to the above-described embodiment. For example, in the above-described embodiment, the X position, the Y position, and the height of the indicator are detected by the self-capacity method, but the present invention also includes a case where the position and the height of the indicator are detected by the mutual capacitance method.

As mentioned above, according to the present disclosure, even when the indicator is located at the peripheral portion of the touch panel and the number of electrodes required for height detection is insufficient, the correction is performed to increase the height position by an amount, so that it is possible to prevent detection accuracy in the height direction due to the position of the indicator from deteriorating.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An input device comprising:
   a touch panel having a plurality of electrodes disposed side by side;
   a detection signal generation unit configured to generate a detection signal used to detect a height to an indicator located at a position spaced away from a surface of the touch panel to input the generated detection signal to each of the plurality of electrodes;
   a position detection unit configured to detect a position of the indicator along the surface of the touch panel based on a signal component that appears on each of the electrodes when the detection signal is input to each of the plurality of electrodes; and
   a height detection unit configured to detect a height of the indicator located at a position spaced away from the surface of the touch panel based on a signal component that appears on each of the electrodes when the detection signal is input to each of the plurality of electrodes, wherein
   when detecting the height of the indicator, the height detection unit performs a correction to increase a height of the indicator when a position of the indicator detected by the position detection unit is included in a peripheral portion of the touch panel, compared with when a position of the indicator detected by the position detection unit is included in a non-peripheral portion of the touch panel.

2. The input device according to claim 1, wherein
   the height detection unit detects the height of the indicator based on a signal component appearing on each of a predetermined number of the electrodes at the non-peripheral portion, and the number of electrodes included in the peripheral portion is less than the predetermined number.

3. The input device according to claim 2, wherein the height detection unit increases, at the peripheral portion, an amount of increase in height correction as a position of the indicator approaches a peripheral edge of the touch panel.

4. The input device according to claim 3, further comprising:
   a signal measurement unit configured to measure a signal intensity proportional to a capacitance generated between the indicator and each of the electrodes based on a signal component appearing on each of the electrodes, wherein
   the height detection unit detects the height of the indicator by summing a signal intensity corresponding to each of a predetermined number of the electrodes centered on a position of the indicator detected by the position detection unit.

5. The input device according to claim 2, further comprising:
   a signal measurement unit configured to measure a signal intensity proportional to a capacitance generated between the indicator and each of the electrodes based on a signal component appearing on each of the electrodes, wherein
   the height detection unit detects the height of the indicator by summing a signal intensity corresponding to each of a predetermined number of the electrodes centered on a position of the indicator detected by the position detection unit.

6. The input device according to claim 1, further comprising:
   a signal measurement unit configured to measure a signal intensity proportional to a capacitance generated between the indicator and each of the electrodes based on a signal component appearing on each of the electrodes, wherein
   the height detection unit detects the height of the indicator by summing a signal intensity corresponding to each of a predetermined number of the electrodes centered on a position of the indicator detected by the position detection unit.

7. The input device according to claim 1, wherein the height detection unit increases, at the peripheral portion, an amount of increase in height correction as a position of the indicator approaches a peripheral edge of the touch panel.

8. The input device according to claim 7, further comprising:
   a signal measurement unit configured to measure a signal intensity proportional to a capacitance generated between the indicator and each of the electrodes based on a signal component appearing on each of the electrodes, wherein
   the height detection unit detects the height of the indicator by summing a signal intensity corresponding to each of a predetermined number of the electrodes centered on a position of the indicator detected by the position detection unit.

9. An input device comprising:
   a touch panel having a plurality of electrodes;
   a detection signal generation unit configured to generate a detection signal used to detect a height to an indicator located at a position spaced away from a surface of the touch panel to input the generated detection signal to each of the plurality of electrodes;
   a position detection unit configured to detect a XY position of the indicator along the surface of the touch panel based on a signal component that appears on each of the electrodes when the detection signal is input to each of the plurality of electrodes; and
   a height detection unit configured to detect a height of the indicator located at a position spaced away from the surface of the touch panel based on a signal component that appears on each of the electrodes when the detection signal is input to each of the plurality of electrodes, wherein
   when detecting the height of the indicator, the height detection unit performs a correction to increase a height of the indicator when the XY position of the indicator detected by the position detection unit is included in a peripheral portion of the touch panel, compared with when the XY position of the indicator detected by the position detection unit is included in a non-peripheral portion of the touch panel.

10. The input device according to claim 9, wherein
    the height detection unit detects the height of the indicator based on a signal component appearing on each of a predetermined number of the electrodes at the non-peripheral portion, and the number of electrodes included in the peripheral portion is less than the predetermined number.

11. The input device according to claim 10, wherein the height detection unit increases, at the peripheral portion, an amount of increase in height correction as the XY position of the indicator approaches a peripheral edge of the touch panel.

12. The input device according to claim 11, further comprising:
    a signal measurement unit configured to measure a signal intensity proportional to a capacitance generated between the indicator and each of the electrodes based on a signal component appearing on each of the electrodes, wherein the height detection unit detects the height of the indicator by summing a signal intensity corresponding to each of a predetermined number of the electrodes centered on the XY position of the indicator detected by the position detection unit.

13. The input device according to claim 10, further comprising:

a signal measurement unit configured to measure a signal intensity proportional to a capacitance generated between the indicator and each of the electrodes based on a signal component appearing on each of the electrodes, wherein the height detection unit detects the height of the indicator by summing a signal intensity corresponding to each of a predetermined number of the electrodes centered on the XY position of the indicator detected by the position detection unit.

14. The input device according to claim 9, further comprising:

a signal measurement unit configured to measure a signal intensity proportional to a capacitance generated between the indicator and each of the electrodes based on a signal component appearing on each of the electrodes, wherein the height detection unit detects the height of the indicator by summing a signal intensity corresponding to each of a predetermined number of the electrodes centered on the XY position of the indicator detected by the position detection unit.

15. The input device according to claim 9, wherein the height detection unit increases, at the peripheral portion, an amount of increase in height correction as the XY position of the indicator approaches a peripheral edge of the touch panel.

16. The input device according to claim 15, further comprising:

a signal measurement unit configured to measure a signal intensity proportional to a capacitance generated between the indicator and each of the electrodes based on a signal component appearing on each of the electrodes, wherein the height detection unit detects the height of the indicator by summing a signal intensity corresponding to each of a predetermined number of the electrodes centered on the XY position of the indicator detected by the position detection unit.

17. An input device comprising:

a touch panel having a plurality of electrodes disposed side by side;

a detection signal generation unit configured to generate a detection signal used to detect a height to an indicator located at a position spaced away from a surface of the touch panel to input the generated detection signal to each of the plurality of electrodes;

a position detection unit configured to detect a position of the indicator along the surface of the touch panel based on a signal component that appears on each of the electrodes when the detection signal is input to each of the plurality of electrodes; and a height detection unit configured to detect a height of the indicator located at a position spaced away from the surface of the touch panel based on a signal component that appears on each of the electrodes when the detection signal is input to each of the plurality of electrodes, wherein when detecting the height of the indicator, the height detection unit performs a correction to correct a height of the indicator when a position of the indicator detected by the position detection unit is included in a peripheral portion of the touch panel, compared with when a position of the indicator detected by the position detection unit is included in a non-peripheral portion of the touch panel.

18. The input device according to claim 17, wherein the height detection unit detects the height of the indicator based on a signal component appearing on each of a predetermined number of the electrodes at the non-peripheral portion, and the number of electrodes included in the peripheral portion is less than the predetermined number.

19. The input device according to claim 18, wherein the height detection unit increases, at the peripheral portion, an amount of height correction as a position of the indicator approaches a peripheral edge of the touch panel.

20. The input device according to claim 18, further comprising:

a signal measurement unit configured to measure a signal intensity proportional to a capacitance generated between the indicator and each of the electrodes based on a signal component appearing on each of the electrodes, wherein the height detection unit detects the height of the indicator by summing a signal intensity corresponding to each of a predetermined number of the electrodes centered on a position of the indicator detected by the position detection unit.

* * * * *